June 18, 1957 H. D. HUME 2,795,921
TINE MOUNTINGS FOR HARVESTER REEL
Filed Sept. 20, 1954 2 Sheets-Sheet 2

INVENTOR.
Horace D. Hume
BY
Atty.

United States Patent Office 2,795,921
Patented June 18, 1957

2,795,921

TINE MOUNTINGS FOR HARVESTER REEL

Horace D. Hume, Mendota, Ill.

Application September 20, 1954, Serial No. 457,160

5 Claims. (Cl. 56—226)

The present invention relates to improvements in outer tine mountings for harvester reels.

It is common practice in present day harvesting operations to utilize a harvester reel having depending tines thereon to pick up the crop and guide it into the cutter mechanism. The reel includes at each end, operating heads which have cranks connecting them to the tines and operate to impart a supplemental rotational movement to the tines with respect to the reel, so that the tines are maintained in a substantially vertical position during their travel. It has been found that the inclusion of a set of outer tines, positioned on the operating heads outside the reel ends, assists greatly in the harvesting operation. These outer tines straighten the crop at the ends of the reel and keep it moving past the divider boards at the ends of the cutter mechanism.

It is the principal purpose of my invention to provide a novel economical mounting for these outer tines, which will cooperate with the operating head to impart the supplemental motion to the outer tines.

A further purpose of the invention is to provide such a mounting which, in case of tine breakage, will hold the broken tine and prevent it from passing into the harvesting machinery.

My improved mounting utilizes a shaft member comprised of a sleeve rotatably mounted in a bearing on the operating head and a bolt which is polygonal in cross section at least at two portions adjacent to its ends, extending through the sleeve. A polygonal aperture in each of the cranks connecting the operating heads to the reel receives the bolt and non-rotatably secures it to the crank. At the opposite end of each bolt, a U-shaped tine holder is positioned. This holder has similar polygonal apertures therein which non-rotatably mount it to the bolt. The outer tine itself has a spring coiled portion therein which encircles the holder and secures the tine thereon. The tine extends upwardly from the coiled portion and has a hooked portion at its upper end which hooks over the bolt and secures the tine against rotation in the holder.

The nature and advantages of my invention will appear more clearly from the following description and the accompanying drawings. It should be understood, however, that the drawings and description are illustrative only and are not intended to limit the invention except insofar as it is limited by the claims.

Figure 1:
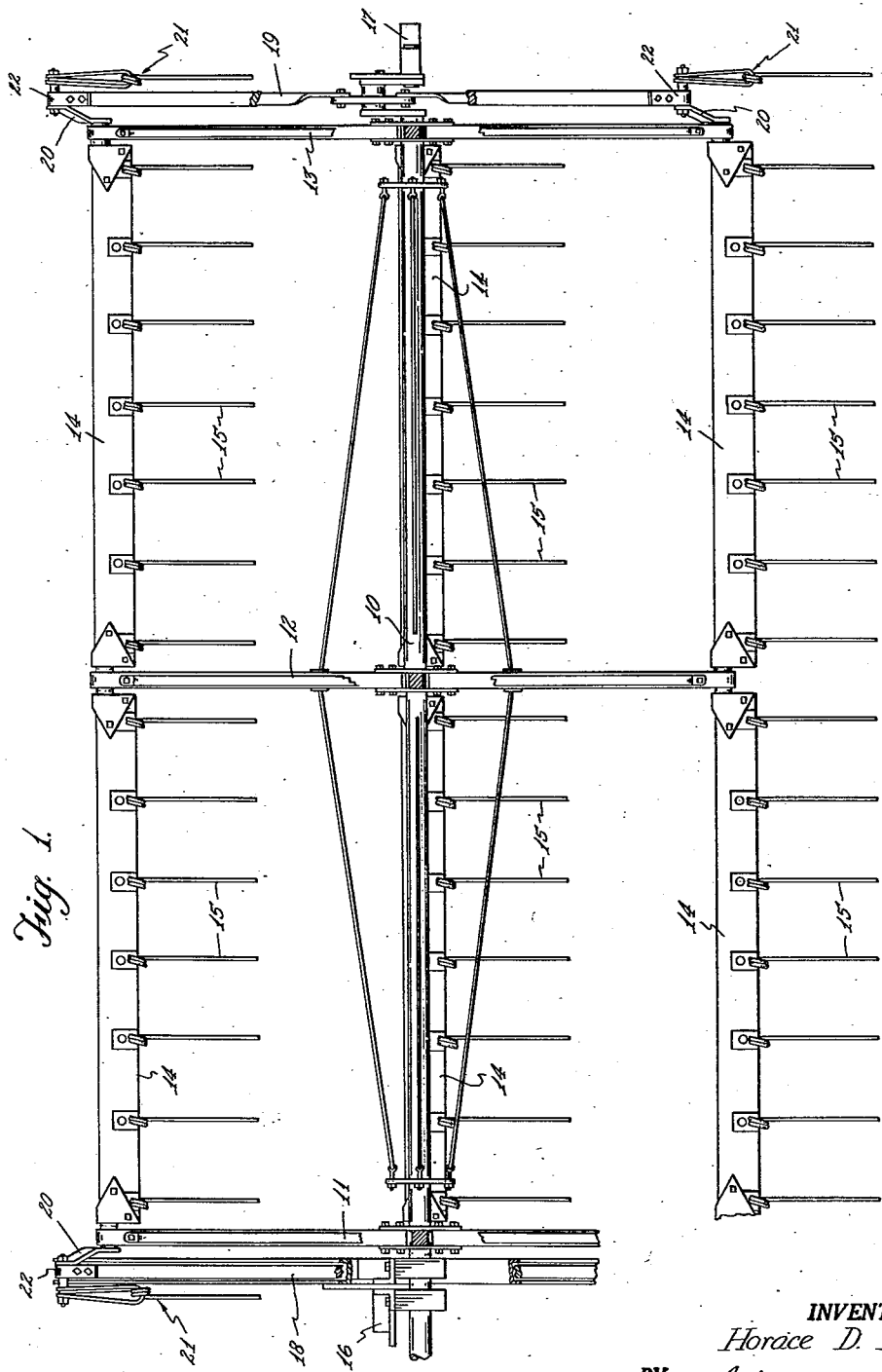
Figure 1 is a view in front elevation of a harvester reel utilizing my invention, with certain of the parts broken away and their connections to the reel being shown in section.
Figure 2:
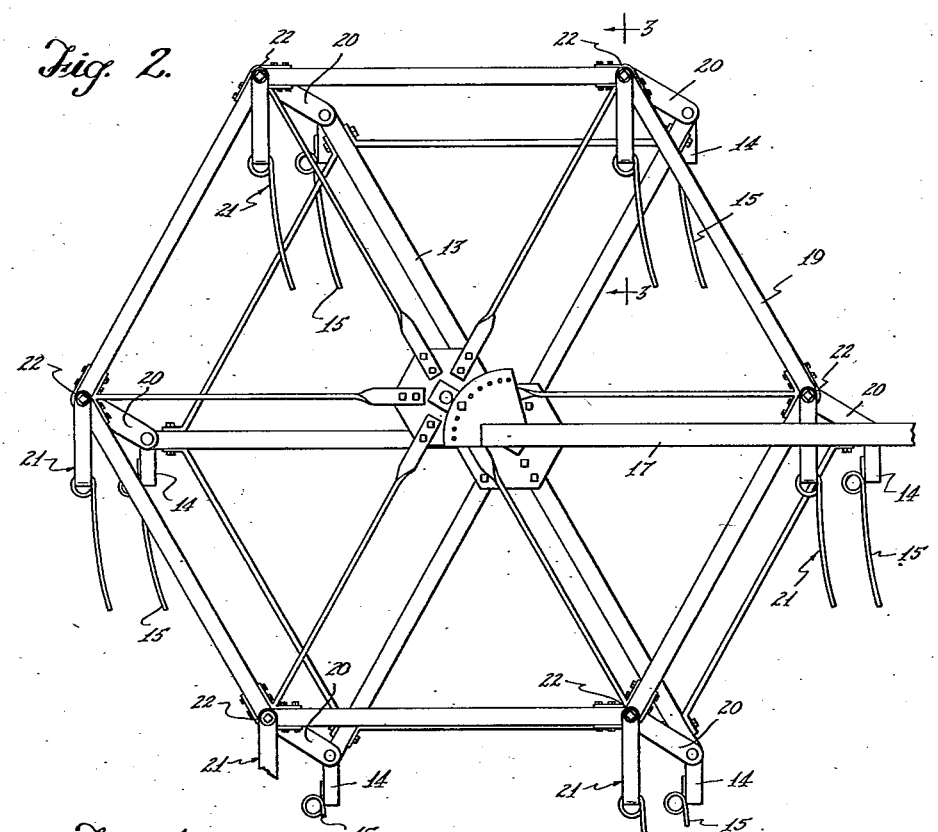
Figure 2 is a view in side elevation of the reel.

Referring now to the drawings and to Figures 1 and 2 in particular, my invention is shown in combination with a harvester reel having a central supporting shaft 10, polygonal supporting frames 11, 12 and 13, reel bats 14 and tines 15. Forwardly extending carrier arms 16 and 17 support the reel on a harvesting machine (not shown). Operating heads 18 and 19 at each end of the reel are included. The heads 18 and 19 are offset with respect to the shaft 10, and are connected to the bats 14 by crank arms 20. The heads 18 and 19 cause the cranks 20 to impart a supplemental rotary motion to the bats 14 as the reel rotates on its axis. The construction and operating characteristics of the heads are old and well known so they will not be described herein.

Outside of the operating heads, and rotatably mounted thereon, are outer tine members 21. These members 21 and the mounting therefor form the substance of my present invention.

Figures 3, 4:
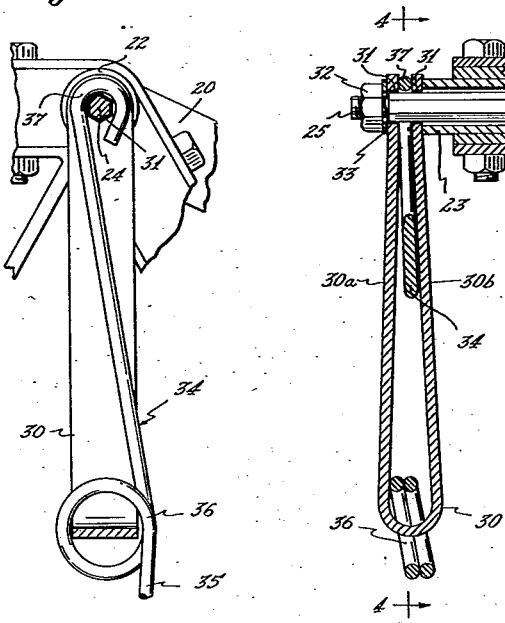
Figure 3 is an enlarged fragmentary sectional view of one of the outer tine mountings taken on the line 3—3 of Figure 2.
Figure 4 is a sectional view taken substantially on the line 4—4 of Figure 3.

Each hexagonal operating head 18 or 19 carries a plurality of bearings 22 thereon, one at each corner of the head. Each of the bearings 22 rotatably receives a sleeve 23 as shown in Figure 3. Inside of the sleeve 23 is positioned a bolt or shaft member 24 that is polygonal in cross section. The bolt 24 has threaded portions 25 and 26 at each end. The bolt 24 is of such a length that it extends a short distance beyond the sleeve 23 at each end. The inner end of the bolt 24 receives the crank arm 20. A polygonal aperture 27 in the crank arm 20 non-rotatably seats it on the bolt 24. A nut 28 and a washer 29 thread on the reduced portion 26 of the bolt 24 to hold the crank arm 20 in place. At the opposite end of the bolt 24, a U-shaped tine holder 30 is positioned. The holder 30 has two upstanding legs 30a and 30b. At the upper end of each leg 30a and 30b is a polygonal aperture 31. The bolt 24 extends through the apertures 31 in the holder 30 and non-rotatably mounts it thereon. A nut 32 and a washer 33 thread on the reduced portion 25 of the bolt 24 to secure the holder in place. By this construction the crank arm 20, is non-rotatably connected to the holder 30 and they may turn together with respect to the head that carries them.

A tine 34 is carried by the holder 30. The tine 34 is constructed of spring steel and comprises a lower crop engaging portion 35, a spring coiled portion 36 formed above the portion 35, and an upper hook portion 37. The hook portion 37 is positioned between the legs 30a and 30b of the holder 30 and hooks over the bolt 24 as shown in Figure 4. The coiled portion 36 of the tine 34 encircles the bottom of the holder 30 and is supported thereby. With this construction, the tine 34 is supported by the holder 30 and is secured against rotation with respect to the holder 30 by the hooked portion 37.

The construction of the outer tine member 21, just described, provides a very novel and economical mounting for the crank arm 20 and the tine 34. The hexagonal bolt 24 supports both the tine holder 30 and the crank arm 20. The angular relationship of these members 20 and 30 is fixed, since each receives the bolt 24 by hexagonal holes 27 and 31. As shown in Figure 3, the sleeve 23 acts as a spacer against which the crank 20 and the holder 30 are pressed by the nuts 28 and 32. The sleeve 23 also acts as a bearing journal for the bearing 22 which supports the assembly on the operating head 18 or 19.

Inspection of Figures 1 and 2 will show that as the shaft 10 is rotated, the operating heads 18 and 19, being offset, will cause the crank arms 20 to rotate with respect to the supporting frames 11, 12 and 13, so that their angular relationship to the ground is maintained the same. Now since the tine holders 30 and tine 34 comprising the outer tine members 21 are non-rotatably fixed to the crank 20, they will be maintained substantially vertical during their travel.

The particular construction of the tine holder 30 and the tine 34 is very advantageous in the event that the tine 34 should break. It has been found that the tine 34 will break most generally in the portion above the coiled section 36. With the construction described herein, a break of this nature will not cause the tine 34 to drop from its mounting and pass into the harvesting machinery. Should the tine 34 break in the section 37, the coiled portion 36 will still remain intact and continue to support the broken tine on the holder 30.

The construction of the holder 30 also lends itself conveniently to easy replacement of broken tines. All that is necessary is to remove the nut 32, pull the holder 30 off the bolt 24, spread the legs 30a and 30b, remove the broken tine, and slip a new one into place. The holder 30 may then be re-mounted on the bolt 24 and secured.

It is believed that the nature and advantages of my invention appear clearly from the foregoing description and the accompanying drawings.

Having thus described my invention, I claim:

1. In a harvester reel having a central shaft, polygonal end supporting frames, bats supported between said frames about the periphery thereof, offset polygonal operating heads having cranks thereon connected to said bats whereby to cause the bats to have supplemental rotary motion with respect to the frames, and outer tine members mounted on bearings in said operating heads, the improvement for mounting said outer tine members which comprises a tubular sleeve rotatably supported by each of said bearings, a bolt extending through each of said sleeves, said cranks being non-rotatably secured to the bolts at one end of the sleeves, U-shaped tine holders positioned at the opposite end of said sleeves and being non-rotatably secured to said bolts, and tines having coiled portions encircling said holders and being supported thereby, said tines having upper hooked portions engaging said bolts.

2. In a harvester reel having a central shaft, polygonal end supporting frames, bats supported between said frames about the periphery thereof, offset polygonal operating heads having cranks thereon connected to said bats whereby to cause the bats to have supplemental rotary motion with respect to the frames, and outer tine members mounted on bearings in said operating heads, the improvement for mounting said outer tine members which comprises a tubular sleeve rotatably supported by each of said bearings, a bolt, polygonal in cross section, extending through said sleeves, said cranks each having a polygonal aperture therein at the end thereof opposite said bats, said apertures receiving the bolts and non-rotatably mounting the cranks thereon adjacent one end of said sleeves, U-shaped tine holders having upstanding legs and having polygonal apertures at the upper ends thereof, said apertures receiving the bolts and non-rotatably mounting the holder thereon at the end of the sleeve opposite the crank, tines having coiled portions therein encircling said holders and having upper hooked portions extending upwardly from said coiled portions between said upstanding legs and engaging said bolt, and threaded portions on the ends of said bolts and having nuts thereon to secure the holders and cranks on said bolts at the ends of said sleeves.

3. In a harvester reel having reel bats and tines thereon intermediate its ends, operating heads at each end connected by cranks to the bats to cause the bats to have supplemental rotary motion with respect to the reel, and outer tine members supported in bearings on said operating heads, the improvement for mounting said outer tine members which comprises a shaft member rotatably supported by each of said bearings, a U-shaped tine holder non-rotatably secured to said shaft member at one end thereof, a tine having a coiled portion therein and having a hooked portion therein extending upwardly from said coiled portion, said hooked portion engaging the shaft member and said coiled portion encircling said holder whereby to support the tine in the holder, and said cranks being non-rotatably secured to the shaft members at the ends thereof opposite said tine holders.

4. In a harvester reel having reel bats and tines thereon intermediate its ends, an offset operating head at one end of the reel, crank means connected to the operating head and to the bats to cause the bats to have supplemental rotary motion with respect to the reel, and outer tine members supported on said operating head, the improvement for mounting said outer tine members which comprises a plurality of shaft members journalled in said operating head, a U-shaped tine holder non-rotatably secured to each shaft member, a tine having a coiled portion therein and having a hooked portion therein extending upwardly from said coiled portion, said hooked portions engaging the shaft member and said coiled portion encircling said holder whereby to support the tine in the holder, and said crank means being non-rotatably secured to the shaft member to support the tine members in fixed relation to the bats.

5. In a harvester reel including end frames, reel bats between the end frames, shaft portions on said bats journalled in said end frames and mounting the bats to the end frames for rotary movement with respect thereto, and outer tine members positioned outside at least one of said end frames, the improvement for mounting the outer tine members which comprises a plurality of shaft members, means non-rotatably securing each of said shaft members to a shaft portion of a reel bat, a U-shaped tine holder non-rotatably secured to each of said shaft members, and a tine having a coiled portion therein and having a hooked portion extending upwardly from the coiled portion, said hooked portion engaging the shaft member and said coiled portion encircling the tine holder whereby to support the tine in the holder.

References Cited in the file of this patent

UNITED STATES PATENTS

| | | |
|---|---|---|
| 2,406,706 | Oehler et al. | Aug. 27, 1946 |
| 2,492,881 | Oehler et al. | Dec. 27, 1949 |
| 2,506,016 | Everett | May 2, 1950 |
| 2,514,560 | Scranton | July 11, 1950 |